US009280735B2

(12) United States Patent
Osaki

(10) Patent No.: US 9,280,735 B2
(45) Date of Patent: Mar. 8, 2016

(54) DATA PROCESSING APPARATUS THAT PROCESSES INFORMATION BASED ON DATA PROCESSING IN CONNECTION WITH USER INFORMATION

(71) Applicant: Oki Data Corporation, Tokyo (JP)

(72) Inventor: Fumihito Osaki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/222,800

(22) Filed: Mar. 24, 2014

(65) Prior Publication Data

US 2014/0204410 A1    Jul. 24, 2014

Related U.S. Application Data

(63) Continuation of application No. 13/283,957, filed on Oct. 28, 2011, now Pat. No. 8,717,588.

(30) Foreign Application Priority Data

Oct. 29, 2010  (JP) ................................. 2010-243905

(51) Int. Cl.
*G06F 3/12*  (2006.01)
*G06K 15/00*  (2006.01)
*G06K 15/02*  (2006.01)
*H04N 1/00*  (2006.01)

(52) U.S. Cl.
CPC .......... *G06K 15/4055* (2013.01); *G06F 3/1219* (2013.01); *G06F 3/1221* (2013.01); *G06F 3/1239* (2013.01); *G06F 3/1285* (2013.01); *G06K 15/1806* (2013.01); *G06K 15/1823* (2013.01); *G06K 15/4005* (2013.01); *G06K 15/4095* (2013.01); *H04N 1/00875* (2013.01); *H04N 1/00896* (2013.01); *Y02B 60/1271* (2013.01)

(58) Field of Classification Search
CPC ... G06F 3/1288; G06F 3/1239; G06F 3/1222; G06F 21/608; G06F 3/1219; H04N 1/4426; H04N 1/00832; H04N 2201/3216; H04N 2201/3274; H04N 2201/0082; H04N 2201/3273; H04N 1/00204; H04N 1/00326
USPC ........................................................ 358/1.15
See application file for complete search history.

(56) References Cited

U.S. PATENT DOCUMENTS

2008/0104594 A1* 5/2008 Funane ........................ 718/100
2009/0279130 A1* 11/2009 Horiyama .................... 358/1.15
2011/0007338 A1* 1/2011 Kawanishi ................... 358/1.14

* cited by examiner

*Primary Examiner* — Martin Mushambo
(74) *Attorney, Agent, or Firm* — Mots Law, PLLC

(57) ABSTRACT

An image formation apparatus configured to execute print processing, includes an information storage configured to store print-limit information and notification-destination information set for each user. The print-limit information includes at least one of a print condition and a limit on a printable amount. A user-information acquisition unit is configured to acquire print-instructing-user information, which is information on a print-instructing user instructing a print-executing user to execute printing. An information-acquisition unit is configured to acquire, from the information storage, the print-limit information and the notification-destination information corresponding to the print-instructing-user information acquired by the user-information acquisition unit, and a notification unit is configured to notify the print-instructing user of a result of print control by the print controller, based on the notification-destination information acquired by the information-acquisition unit.

14 Claims, 17 Drawing Sheets

FIG. 2

| USER NAME | POSITION | DEPARTMENT | MAIL ADDRESS | USER ID | PASSWORD | PRINT LIMIT NUMBER | NUMBER OF PRINTED SHEET | COLOR PRINTING ALLOWED |
|---|---|---|---|---|---|---|---|---|
| TANAKA | GENERAL | SALES DEPARTMENT 1 | tanaka@xxx.xx | tanaka | *** | 50 | 30 | no |
| KIMURA | SECTION CHIEF | SALES DEPARTMENT 1 | kimura@xxx.xx | kimura | *** | 100 | 40 | yes |
| SATOU | DEPARTMENT CHIEF | SALES DEPARTMENT 1 | satou@xxx.xx | satou | *** | UNLIMITED | 120 | yes |

FIG. 4

SELECT PRINT-INSTRUCTING USER

| USER NAME | POSITION | DEPARTMENT |
|---|---|---|
| ○ KIMURA | CHIEF OF SECTION | SALES DEPARTMENT 1 |
| ⬤ SATOU | CHIEF OF DEPARTMENT | SALES DEPARTMENT 1 |

OK  CANCEL

FIG. 5

```
%-12345X
@PJL AUXJOBINFO DATA="ComputerName=computer01"
@PJL AUXJOBINFO DATA="UserID=tanaka"
@PJL AUXJOBINFO SECURE PASSWORD=****
@PJL AUXJOBINFO DATA="InstructionUserID=satou"
@PJL AUXJOBINFO DATA="PortName=xx.xx.xx.xx"
@PJL AUXJOBINFO DATA="Reception Time=xx:xx:xx  xxxx/xx/xx"
@PJL AUXJOBINFO DATA="DocumentName=BUSINESS REPORT09.doc"
@PJL AUXJOBINFO DATA="Page=15"
%-12345X@PJL ENTER LANGUAGE=PCL
~~~~~~~~~~~
    PRINT DATA
~~~~~~~~~~~
@PJL EOJ NAME="End"
%-12345X
```

FIG. 7

| PRINT LOG NUMBER | PRINT FILE NAME | PRINT-EXECUTING USER | PRINT-EXECUTING USER ID | PRINT-INSTRUCTING USER | PRINT-INSTRUCTING USER ID | NUMBER OF PRINTED SHEETS | PRINTING DATE AND TIME |
|---|---|---|---|---|---|---|---|
| 1001 | BUSINESS REPORT 09.doc | TANAKA | tanaka | SATOU | satou | 15 | xx/xx/xx xxxx |

FIG. 8

```
THE FOLLOWING PRINTING WAS EXECUTED
WITH YOU SET AS PRINT-INSTRUCTING USER

PRINT-EXECUTING USER : TANAKA
APPARATUS NAME : MULTI-FUNCTION PRINTER300 (xx.xx.xx.xx)
DOCUMENT NAME : BUSINESS REPORT09.doc
NUMBER OF PRINTED SHEETS : 15
DATE AND TIME : xx/xx/xx xx:xx:xx
```

FIG. 9

```
COMPLETION OF PRINTING IS NOTIFIED TO
PRINT-INSTRUCTING USER

PRINT-INSTRUCTING USER : SATOU
APPARATUS NAME : MULTI-FUNCTION PRINTER300 (xx.xx.xx.xx)
DOCUMENT NAME : BUSINESS REPORT09.doc
NUMBER OF PRINTED SHEETS : 15
DATE AND TIME : xx/xx/xx xx:xx:xx
```

FIG. 11

```
DEFINE PRINT INSTRUCTION

PRINT-EXECUTING USER     [ TANAKA  ]

NUMBER OF PRINTABLE      [   20    ]
SHEETS
PRINT-ALLOWING PERIOD    [ 12 HOURS]

[ OK ]    [ CANCEL ]
```

FIG. 12

| PRINT-INSTRUCTION ID | PRINT-INSTRUCTING USER | PRINT-INSTRUCTING-USER ID | PRINT-EXECUTING-USER ID | NUMBER OF PRINTABLE SHEETS | PRINT-ALLOWING PERIOD |
|---|---|---|---|---|---|
| JN001 | SATOU | satou | tanaka | 20 | 12 HOURS |

FIG. 16

```
%-12345X
@PJL AUXJOBINFO DATA="ComputerName=computer01"
@PJL AUXJOBINFO DATA="UserID=tanaka"
@PJL AUXJOBINFO SECURE PASSWORD=****
@PJL AUXJOBINFO DATA="InstructionJobID=JN001"
@PJL AUXJOBINFO DATA="PortName=xx.xx.xx.xx"
@PJL AUXJOBINFO DATA="Reception Time=xx:xx:xx xxxx/xx/xx"
@PJL AUXJOBINFO DATA="DocumentName=BUSINESS REPORT09.doc"
@PJL AUXJOBINFO DATA="Page=15"
%-12345X@PJL ENTER LANGUAGE=PCL
~~~~~~~~~~~
    PRINT DATA
~~~~~~~~~~~
@PJL EOJ NAME="End"
%-12345X
```

DATA PROCESSING APPARATUS THAT PROCESSES INFORMATION BASED ON DATA PROCESSING IN CONNECTION WITH USER INFORMATION

CROSS REFERENCE TO RELATED APPLICATIONS

This application is a continuing application of application Ser. No. 13/283,957 filed on Oct. 28, 2011, which is based upon and claims the benefit of priority from the prior Japanese Patent Application No. 2010-243905, filed on Oct. 29, 2010, the entire contents of which is incorporated herein by reference.

BACKGROUND OF THE INVENTION

1. Field of the Invention

The present disclosure relates to an image formation apparatus that prints an image in accordance with print data received from a user terminal, and also relates to an image formation system using the image formation apparatus.

2. Description of Related Art

A conventional image formation apparatus is configured to save power consumption as follows. Specifically, the apparatus sets the maximum number of printable sheets per user for print requests received in the power saving mode, and rejects a print request received in the power saving mode if the print request is judged to cause the total number of printed sheets to exceed the maximum number. Thus, the apparatus reduces the frequency of cancelling the power saving mode and returning to the printable state (see, for instance, JP 2005-193560A (paragraph [0059])).

SUMMARY OF THE INVENTION

With the maximum number of printable sheets preset for each user, the above-described conventional technique has, in some cases, difficulty in operating and managing the maximum numbers of printable sheets for the users correctly. For instance, suppose a user is told by his/her superior to print sheets and sends a print request from the terminal of the user to the image formation apparatus. In this case, the printed sheets are counted, not for the superior who gave the print instruction, but for the user of the terminal that sent the print request.

An aspect of the invention is an image formation apparatus configured to execute print processing. The image forming apparatus includes: an information storage configured to store print-limit information and notification-destination information set for each user, with the print-limit information including at least one of a print condition and a limit on a printable amount; a user-information acquisition unit configured to acquire print-instructing-user information, which is information on a print-instructing user instructing a print-executing user to execute printing; an information-acquisition unit configured to acquire, from the information storage, the print-limit information and the notification-destination information corresponding to the print-instructing-user information acquired by the user-information acquisition unit; and a notification unit configured to notify the print-instructing user of a result of print control by the print controller, on the basis of the notification-destination information acquired by the information-acquisition unit.

According to the aspect, it is possible to correctly manage the maximum number of printable sheets for each user.

BRIEF DESCRIPTION OF THE DRAWINGS

FIG. 2 is a descriptive diagram illustrating an example of rows of print-limit information.

FIG. 4 is a descriptive diagram illustrating a print-instructing-user selection screen.

FIG. 5 is a descriptive diagram illustrating an example of the configuration of print data created by a printer driver.

FIG. 7 is a descriptive diagram illustrating an example of a print log.

FIG. 8 is a descriptive diagram illustrating an example of an e-mail directed to a print-instructing user.

FIG. 9 is a descriptive diagram illustrating an example of an e-mail directed to a print-instructing user.

FIG. 11 is a descriptive diagram illustrating a print-instruction definition screen.

FIG. 12 is a descriptive diagram illustrating the configuration of print-instruction definition information.

FIG. 16 is a descriptive diagram illustrating an example of image data according to the second embodiment.

DESCRIPTION OF THE PREFERRED EMBODIMENTS

Figure 1:
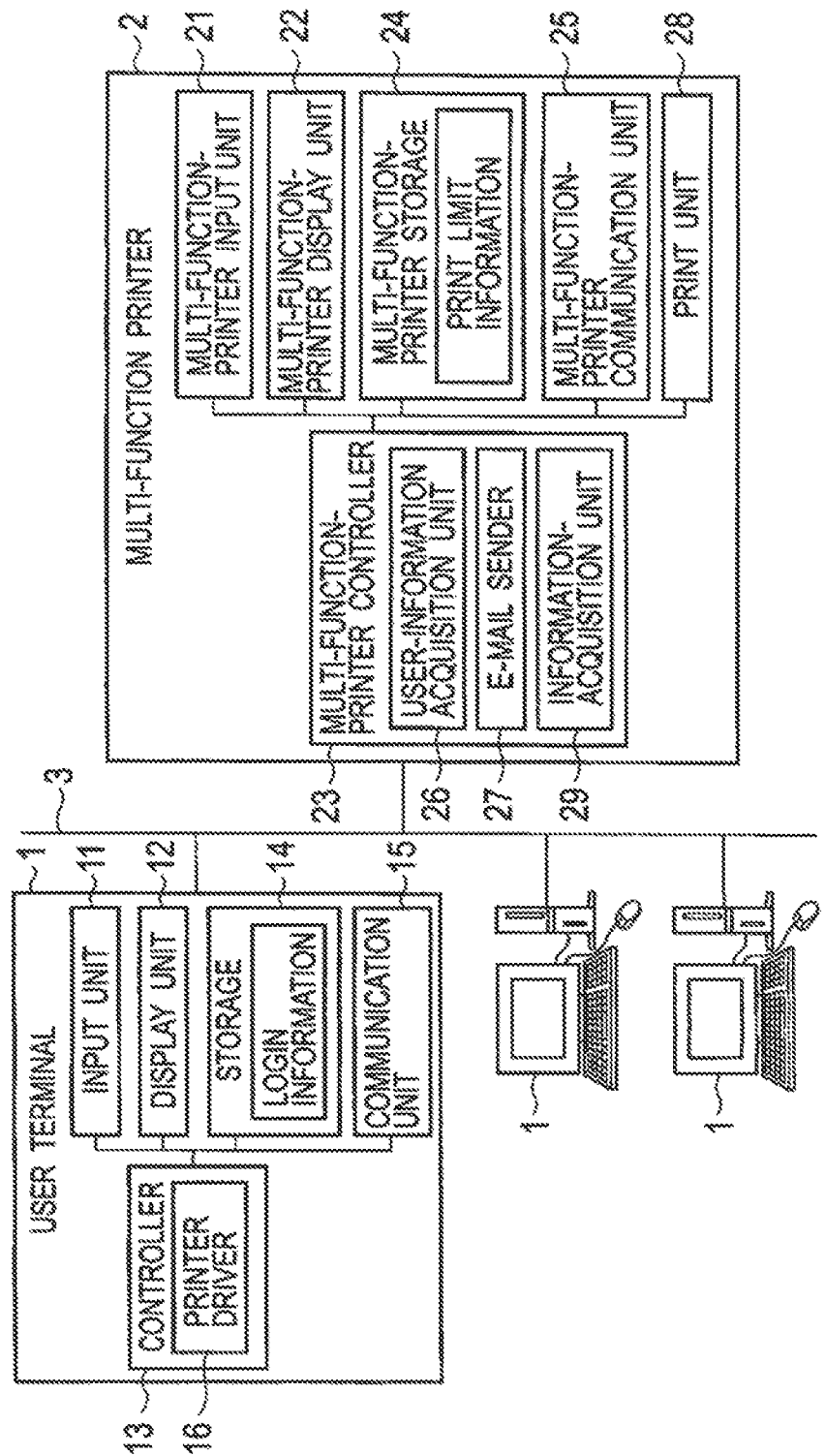
FIG. 1 is a block diagram illustrating an image formation system according to a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Image formation systems according to some embodiments of the invention are described below by referring to the drawings.

First Embodiment

FIG. 1 is a block diagram illustrating an image formation system according to a first embodiment. The image formation system shown in FIG. 1 includes user terminals 1 and multi-function printer 2 serving as an image formation apparatus, all of which are placed in a company. These apparatuses are communicably connected to one another by means of network 3, such as a corporate LAN. Each of user terminals 1 includes input unit 11, display unit 12, controller 13, storage 14, and communication unit 15.

Input unit 11 is an input device including a keyboard and a mouse, and has a function of accepting input operations from the user. Display unit 12 is a display device, such as an LCD device or a CRT display device, and has a function of displaying various screens showing the procedure of the operations and the content of input by the user through input unit 11. Controller 13 has a function of executing various processing operations in accordance with the control programs stored in storage 14, and communicates through communication unit 15 with other user terminals 1 and multi-function printer 2.

Storage 14 stores not only the control programs but also various kinds of application programs, such as a document preparation application program used to create documents. Storage 14 also stores the results of processing executed by controller 13 and the like. In addition, storage 14 stores the print-user's login information of the user's own terminal 1. The login information includes: User Name that shows the name of the user of user terminal 1; User ID that is used to identify the user, such as a login name of user terminal 1; and a password.

Printer driver 16 is implemented by controller 13 together with the control program stored in storage 14, and creates print data for causing multi-function printer 2 to execute print processing. Controller 13 has a function of sending and receiving e-mails in accordance with the control program and a function of making display unit 12 display the received e-mails. If controller 13 receives an e-mail containing a result of print processing operations from multi-function printer 2, which is to be described later, controller 13 uses the above-described two functions and display unit 12, to make display unit 12 display the e-mail showing the result of the print processing operations.

Hence, controller 13 and display unit 12 function as a control-result output unit to output the result of controlling the print processing received from multi-function printer 2. Multi-function printer 2 includes multi-function-printer input unit 21, multi-function-printer display unit 22, multi-function-printer controller 23 (print controller), multi-function-printer storage 24 (information storage), multi-function-printer communication unit 25, and print unit 28. Multi-function printer 2 receives, from user terminal 1, print data used to execute print processing, and executes print processing in accordance with the received print data.

Multi-function-printer input unit 21 includes a numeric keypad and input keys of various kinds, and has a function of accepting the inputs by the user using these keys. Multi-function-printer display unit 22 is an LCD device, a CRT display device, or the like, and has a function of displaying screens of various kinds. Multi-function-printer controller 23 has a function of executing operations of various kinds of processing, such as print processing, in accordance with the control program stored in multi-function-printer storage 24 and used for properly operating various parts of multi-function printer 2. In addition, multi-function-printer controller 23 is communicably connected to user terminals 1 through multi-function-printer communication unit 25.

Multi-function-printer storage 24 stores the control program as well as the result of processing executed by multi-function-printer controller 23. Multi-function-printer storage 24 manages: information on the maximum number of printable sheets, indicating the number of sheets allowed for each user to print for each day; information on whether the user is allowed to perform double-sided printing and color printing; and print-limit information on how many sheets have been printed thus far, and the like. In addition, multi-function-printer storage 24 also stores terminal-user information, which is information on the User Name of each user terminal 1 associated with his/her User ID.

FIG. 2 is a descriptive diagram illustrating an example of rows of print-limit information. As shown in FIG. 2, the print-limit information includes combined various items including: the User Name of user terminals 1, the User Name being described as generally-used names, such as "Tanaka," "Kimura," and "Satou"; the user's position, department, and mail address (notification-destination information); User ID; and password set in the user terminal; the print-limit number as the maximum number of printable sheets (print amount); the number of sheets printed on the day by print processing; and other settable items related to printing (print conditions), such as the availability of color printing indicating whether the user is or is not allowed to perform color printing.

Note that, besides the items mentioned above, the print-limit information may also include other settable items related to printing, such as the availability of double-sided printing indicating whether the user is or is not allowed to perform double-sided printing.

User-information acquisition unit 26 shown in FIG. 1 is implemented by multi-function-printer controller 23 and the control program stored in multi-function-printer storage 24. From the print data received from user terminals 1, user-information acquisition unit 26 extracts and thereby acquires print-executing-user information containing the User ID of the person who creates the print data, and print-instructing-user information described later containing the User ID of the person who has instructed the printing.

Electronic-mail sender 27 serves as a notification unit, and is implemented by multi-function-printer controller 23 and the control program stored in multi-function-printer storage 24. Electronic-mail sender 27 sends, to user terminal 1, an e-mail containing the result of print processing operations executed by multi-function printer 2, and thereby notifies the user of the result of the print processing. Print unit 28 includes an unillustrated print mechanism that has the function of printing print data on a sheet for print set beforehand and outputting the sheet.

Information-acquisition unit 29 is implemented by multi-function-printer controller 23 and the control program stored in multi-function-printer storage 24. Information-acquisition unit 29 reads and thereby acquires, from multi-function-printer storage 24, information of various kinds, such as the print-limit information and the information on the mail address of the user.

Now, description is provided below of print processing operations performed by an image formation system where user terminal 1 instructs multi-function printer 2 to execute printing according to the operations in the above described configuration.

Figure 3:
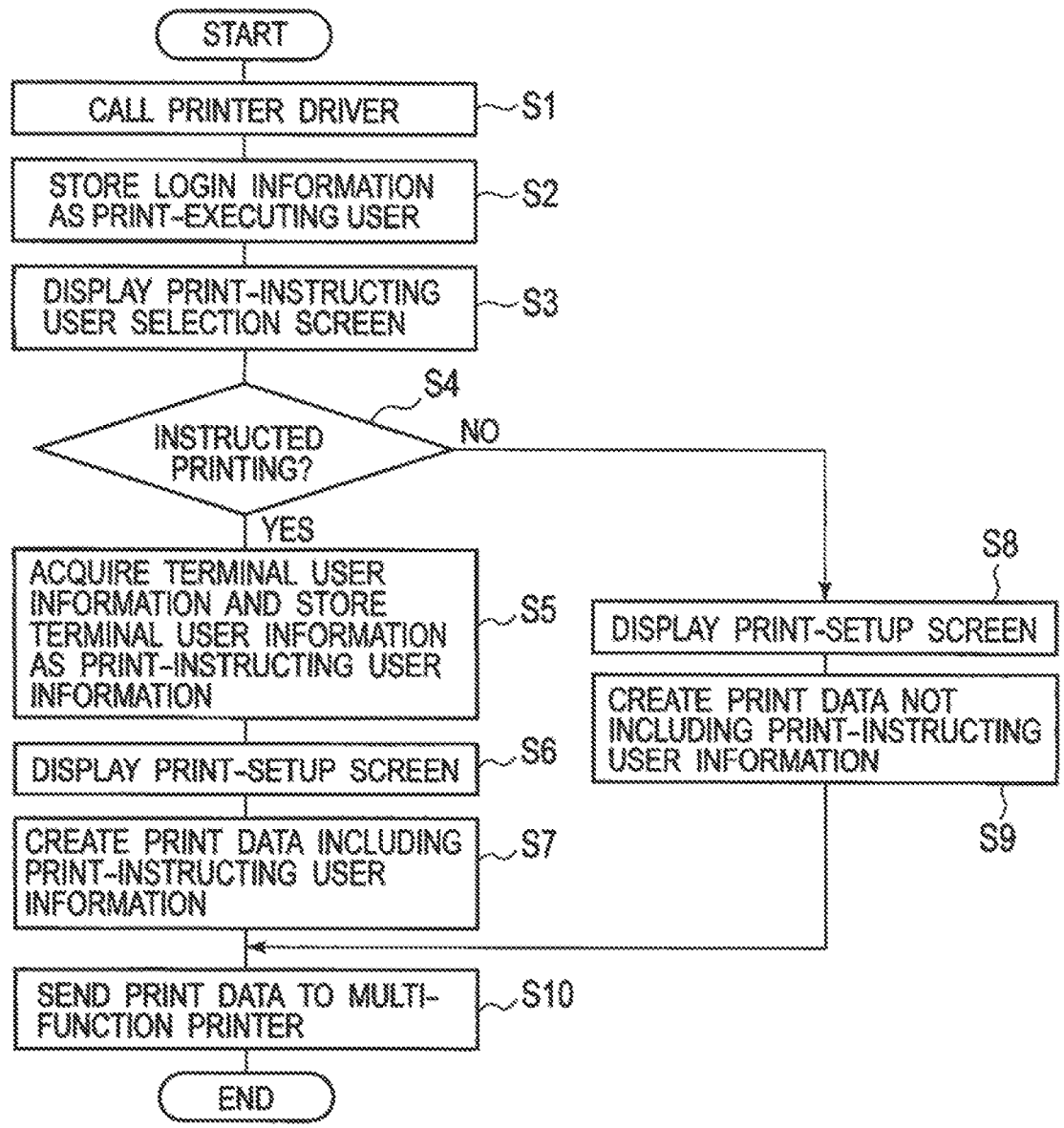
FIG. 3 is a flowchart illustrating print-data creation using a user terminal according to the first embodiment.

First of all, processing operations to create print data are described by referring to the flowchart shown in FIG. 3 illustrating the print-data creation by the user terminal according to the first embodiment with steps denoted by S.

Here, "Tanaka," whose position is "general," as shown in FIG. 2 uses input unit 11 of his/her user terminal 1 to perform operations to make multi-function printer 2 print a document that has been prepared in advance. It is assumed here that the document to be printed is stored in storage 14 of user terminal 1 of "Tanaka," and "Tanaka" him/herself uses input unit 11 of his/her own user terminal in order to perform print-execution operations to make multi-function printer 2 execute the printing.

At step S1, if controller 13 of user terminal 1 determines that print-execution operations are performed through input unit 11, controller 13 calls printer driver 16 from the application program.

At step S2, controller 13 reads the stored login information. Controller 13 stores and holds the read login information as print-executing-user information in storage 14.

At step S3, controller 13 makes communication unit 15 send a message requesting print-limit information through network 3 to multi-function printer 2, and thereby acquires the print-limit information. On the basis of the acquired print-limit information, controller 13 makes display unit 12 display a print-instructing-user selection screen.

FIG. 4 is a descriptive diagram illustrating the print-instructing-user selection screen. As shown in FIG. 4, the print-instructing-user selection screen includes: a list showing users of other user terminals 1 who can be designated as the print-instructing user; an OK button to confirm the selection of the print-instructing user; and a cancellation button for proceeding to the execution of the printing without the selection of the print-instructing user. Besides the User Names, the list of the print-instructing-user selection screen includes information on the position and the department as attributions of the listed user, and radio buttons to be used to select the print-instructing user.

Controller 13 extracts the user on the list specifically on the basis of his/her position contained in the print-limit information. Since "Tanaka" is the person who actually uses the user terminal 1, controller 13 extracts, from the users of the other user terminals 1, his/her superiors "Kimura" and "Satou" at higher positions (section chief and department chief respectively) than the position (general) of "Tanaka" as the users displayed on the list.

At step S4, controller 13 checks whether the OK button is or is not pressed, and thereby judges whether the printing is instructed to be executed. If controller 13 judges that the printing is instructed, controller 13 proceeds to step S5. Conversely, if controller 13 confirms that the cancellation button is pressed and thereby judges that the printing is not instructed, controller 13 proceeds to step S8.

Now suppose a case where "Tanaka," whose position is general, is instructed by his/her superior "Satou," whose position is department-chief, to make multi-function printer 2 print a document that has been prepared in advance. Here, the selection of "Satou" from the listed persons is made with the corresponding radio button and an input of the OK button. In this case, at step S5, if controller 13 recognizes the input of the OK button, controller 13 sends a message requesting the terminal-user information of "Satou," who has been selected with the radio button to multi-function printer 2, and thereby acquires the corresponding terminal-user information from multi-function printer 2. Controller 13 stores and holds the acquired terminal-user information as the print-instructing-user information in storage 14.

At step S6, controller 13 makes display unit 12 display a print-setup screen where the user inputs various items such as the designation of the print target, the number of sheets to be printed, and whether the printing is or is not in color. "Tanaka" inputs, with the print-setup screen, the document name to be printed and his/her selection of whether the printing is or is not in color.

At step S7, controller 13 reads the document corresponding to the inputted document name from storage 14, and also reads, from storage 14, both the print-executing-user information stored at step S2 and the print-instructing-user information stored at step S5. Then, printer driver 16 creates print data by combining the print-executing-user information, the print-instructing-user information, and the content inputted on the print-setup screen, and then proceeds to step S10.

FIG. 5 is a descriptive diagram illustrating an example of the configuration of print data created by a printer driver. As FIG. 5 shows, the print data includes, for instance, the following items: a name of the computer represented by "Computer Name" and used to identify the user terminal 1 that is used to create the print data; a user ID of the user (hereinafter, referred to as the "print-executing user") who uses user terminal 1 represented by "User ID," i.e., the User ID of "Tanaka" (hereinafter, referred to as the "print-executing-user ID"); a password contained in the login information represented by "PASSWORD"; a user ID corresponding to the print-instructing-user information represented by "Instruction User ID" (hereinafter, referred to as the "print-instructing user ID"); a port name of multi-function printer 2 represented by "Port Name"; printing date and time represented by "Reception Time"; a name of the document to be printed represented by "Document Name"; the number of pages to be printed represented by "Page"; and items indicating data of the document and images to be printed, the print description language for the data, and the number of copies to be printed.

In the case shown in FIG. 5, the print description language is PCL (print control language), but other printer description language such as PS (post script) may be used instead.

If controller 13 judges that the printing is not instructed at step S4, controller 13 makes display unit 12 display the print-setup screen at step S8.

At step S9, controller 13 reads, from storage 14, the document corresponding to the document name inputted through the print-setup screen, and also reads, from storage 14, the print-executing-user information stored at step S2. Then, printer driver 16 combines the print-executing-user information with the content inputted through the print-setup screen, and thereby creates print data that contains no print-instructing-user information. Then, printer driver 16 proceeds to step S10.

At step S10, printer driver 16 makes communication unit 15 send the created print data through network 3 to multi-function printer 2, and thus terminates the processing of creating the print data.

Figure 6:
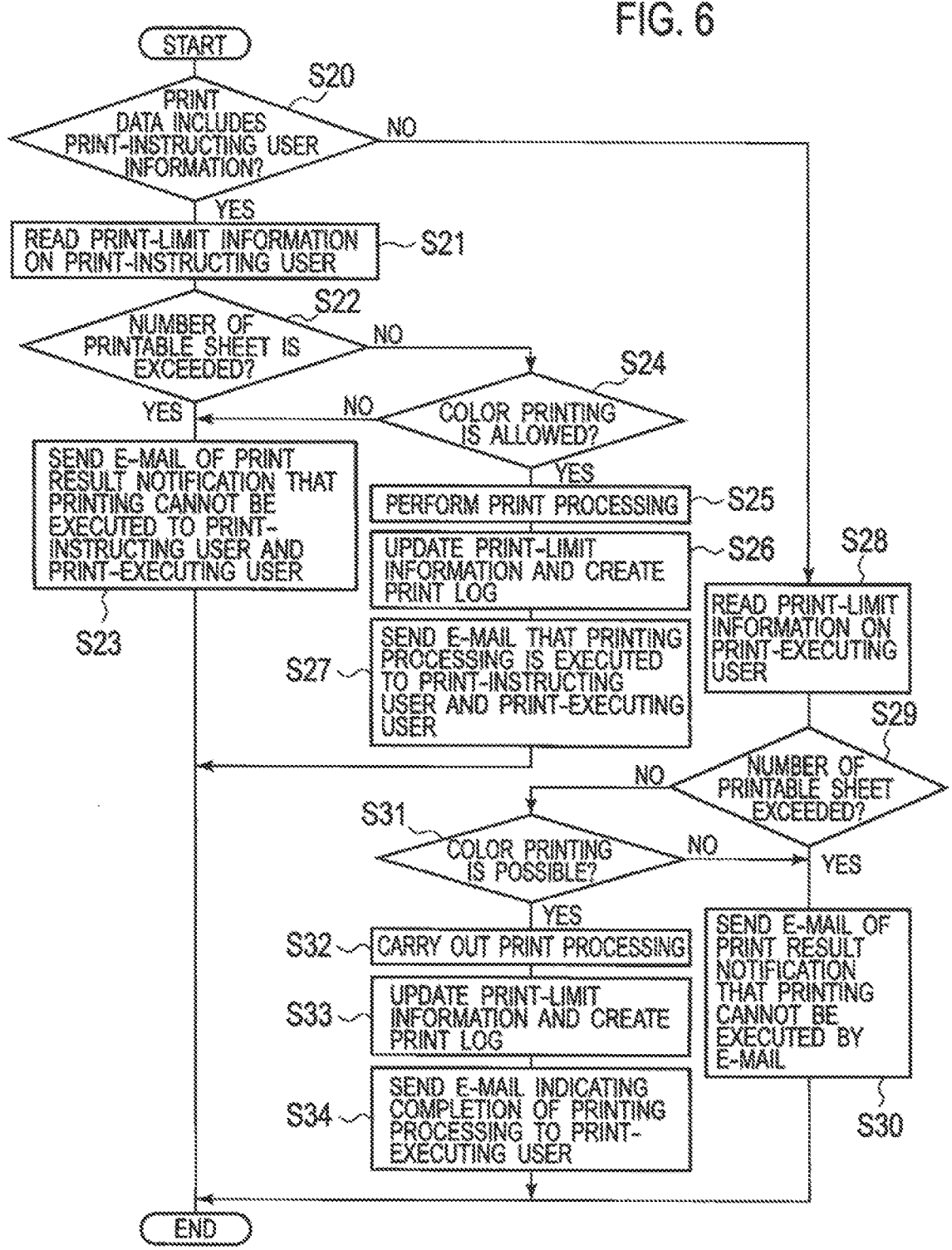
FIG. 6 is a flowchart illustrating print processing by a multi-function printer according to the first embodiment.

Next, the print processing is described by referring to the flowchart shown in FIG. 6 illustrating the print processing by the multi-function printer according to the first embodiment with steps denoted by S. Note that the print processing of this first embodiment is for color printing.

At step S20, multi-function-printer controller 23 stores print data received from user terminal 1 in multi-function-printer storage 24 and user-information acquisition unit 26 checks whether or not the print data includes print-instructing-user information. Multi-function-printer controller 23 proceeds to step S21 when the print-instructing-user information is included and proceeds to step S28 when no print-instructing-user information is included.

At step S21, user-information acquisition unit 26 acquires the print-instructing-user information from the print data. Then, on the basis of the acquired print-instructing-user information, information-acquisition unit 29 reads, from multi-function-printer storage 24, the print-limit information of the print-instructing user, "Satou."

At step S22, on the basis of the number of pages to be printed and the number of copies to be printed that are contained in the print data, multi-function-printer controller 23 calculates the number of sheets to be printed in the printing of this time. Then, multi-function-printer controller 23 judges whether or not the total number of the number of printed sheets contained in the read print-limit information of "Satou" and the calculated number of sheets to be printed exceeds the maximum number of printable sheets contained in the print-limit information of "Satou." If multi-function-printer controller 23 judges that the total number of sheets does not exceed the maximum number of printable sheets, multi-function-printer controller 23 proceeds to step S24. In this particular case, the number of printable sheets for "Satou" is unlimited as shown in FIG. 2. If, however, the number of printable sheets for the print-instructing user is limited and the total number of sheets calculated at step S22 exceeds the limited number of printable sheets, multi-function-printer controller 23 proceeds to step S23.

At step S23, multi-function-printer controller 23 creates a print-result notification which states that the printing is not executable due to the print limit. In the meanwhile, information-acquisition unit 29 reads, from the print-limit information, the mail address of "Satou" as the name of the print-instructing user (print-instructing-user name) and the mail address of "Tanaka" as the name of the print-executing user (print-executing-user name). Then, multi-function-printer controller 23 sends e-mails, each with the created print-result notification, to "Satou" and "Tanaka," and then stops the print processing.

At step S24, on the basis of the information contained in the print-limit information on whether color printing is or is not executable, multi-function-printer controller 23 checks whether the stored print data is printable or not. If multi-function-printer controller 23 judges that the print data is printable, multi-function-printer controller 23 proceeds to step S25. Specifically in this embodiment, according to the print-limit information of "Satou," color printing is executable because "yes" is put for the availability of color printing for "Satou" as shown in FIG. 2. If, in contrast, color printing is not available for the print-instructing user and multi-function-printer controller 23 judges that the printing is not executable for that reason, multi-function-printer controller 23 proceeds to step S23, and then stops and terminates the print processing.

At step S25, multi-function-printer controller 23 makes print unit 28 carry out the print processing to print the document of the print target contained in the print data.

At step S26, multi-function-printer controller 23 adds the number of sheets to be printed, calculated at step S22, to the number of printed sheets contained in the print-limit information corresponding to the print-instructing user ID to update the print-limit information.

In addition, multi-function-printer controller 23 creates a print log (log information) containing a content stating that print processing instructed by "Satou" has been executed using the print data received from user terminal 1 of "Tanaka". Multi-function-printer controller 23 stores the created print log in multi-function-printer storage 24.

FIG. 7 is a descriptive diagram illustrating an example of the print log. As FIG. 7 shows, the print log includes: a print-log number, which is a serial number counted in the order of the execution of print processing; a print-file name, which is the name of the print data used in the print processing; a print-executing-user name and a print-executing-user ID, i.e., the name and the User ID of the person who sends the image data; a print-instructing-user name and a print-instructing user ID if the print processing is instructed; the number of printed sheets; and printing date and time.

FIG. 8 is a descriptive diagram illustrating an example of an e-mail directed to a print-instructing user.

At step S27, multi-function-printer controller 23 creates an e-mail such as one shown in FIG. 8 containing: a statement such as "the following printing was executed with you set as the print-instructing user" notifying the execution of the print processing done by an instruction made by a print-instructing user; an item indicating the print-executing user; an item indicating multi-function printer 2 as having executed the printing; an item of Document Name indicating the name of the print-target document; an item indicating the number of printed sheets; and an item indicating the printing date and time.

Then, on the basis of the print-instructing user ID contained in the print data, information-acquisition unit 29 reads the mail address by referring to the corresponding print-limit information of "Satou," and e-mail sender 27 sends the e-mail to the mail address. Thus, the print-instructing user, "Satou," can check the content of the e-mail, for instance, in the display unit 12 of user terminal 1 that he/she uses. Accordingly, the print-instructing user, "Satou," can make sure that the printing that he/she had instructed has been completed.

In addition, on the basis of the print-executing-user information attached to the print data, multi-function-printer controller 23 creates an e-mail directed to the print-executing user, "Tanaka," notifying him/her that the print processing has been completed. Then, e-mail sender 27 sends the e-mail to the mail address of "Tanaka," which is read by information-acquisition unit 29 in a similar manner to the one described above. Then, the print processing is terminated.

FIG. 9 is a descriptive diagram illustrating an example of an e-mail directed to a print-instructing user. As FIG. 9 shows, the e-mail is sent that contains: a statement such as "Completion of the printing is notified to the print-instructing user" that indicates that the print-instructing user, "Satou," has been notified of the fact that the printing has been completed; an item indicating the print-instructing user; an item indicating multi-function printer 2 as having executed the printing; an item indicating the Document Name; an item indicating the number of printed sheets; and printing date and time. Thus, the print-executing user, "Tanaka," can check the content of the e-mail, for instance, in the display unit 12 of user terminal 1 that he/she uses. Accordingly, the print-executing user, "Tanaka," confirms that the printing has been completed.

If there is no print-instructing-user information at step S20, the process proceeds to Step S28 where information-acquisition unit 29 reads, from multi-function-printer storage 24, the print-limit information of the print-instructing user, "Tanaka" on the basis of the print-executing-user information contained in the print data.

At step S29, on the basis of the number of pages to be printed and the number of printed copies contained in the print data, multi-function-printer controller 23 calculates the number of sheets to be printed in the printing processing of this time. Then, multi-function-printer controller 23 judges whether a total number of the number of printed sheets contained in the read print-limit information of "Tanaka," and the calculated number of sheets to be printed, does or does not exceed the maximum number of printable sheets contained in the print-limit information of "Tanaka." If multi-function-printer controller 23 judges that the total number of sheets does not exceed the maximum number of printable sheets, multi-function-printer controller 23 proceeds to step S31. If, in contrast, multi-function-printer controller 23 judges that the total number of sheets exceeds the maximum number of printable sheets, multi-function-printer controller 23 proceeds to step S30.

At step S30, multi-function-printer controller 23 creates a print-result notification which states that the printing is not executable due to the print limit. In the meanwhile, information-acquisition unit 29 reads, from the print-limit information, the mail address of "Tanaka" as the print-executing user. Then, e-mail sender 27 sends an e-mail with the created print-result notification to "Tanaka," and stops and terminates the print processing. Then, at step S31, on the basis of information contained in the print-limit information on whether color printing is or is not executable, multi-function-printer controller 23 checks whether the stored print data is printable or not.

Specifically in this embodiment, according to the print-limit information of "Tanaka," color printing is not executable. Hence, multi-function-printer controller 23 judges that the printing is not executable, and proceeds to step S30 and stops the print processing. If, in contrast, color printing is available for "Tanaka," multi-function-printer controller 23 proceeds to step S32.

At step S32, multi-function-printer controller 23 makes print unit 28 carry out the print processing to print the document of the print target contained in the print data.

At step S33, multi-function-printer controller 23 adds the number of sheets to be printed as calculated at step S29 to the number of printed sheets contained in the print-limit information corresponding to the print-executing user ID, that is, contained in the print-limit information of "Tanaka," to update the print-limit information. In addition, multi-function-printer controller 23 creates a print log containing a content stating that print processing has been executed on the basis of the content in the print data. Multi-function-printer controller 23 stores the created print log in multi-function-printer storage 24.

At step S34, multi-function-printer controller 23 creates an e-mail notifying the print-executing user, "Tanaka," of the fact that the print processing has been completed. In the meanwhile, on the basis of the print-executing-user ID, information-acquisition unit 29 reads, from the print-limit information, the mail address of "Tanaka." Then, e-mail sender 27 sends the created e-mail to the mail address of "Tanaka," and then the print processing is completed.

Thus, the print-executing user, "Tanaka," can check the content of the e-mail, for instance, in the display unit 12 of user terminal 1 that he/she uses. Accordingly, the print-executing user, "Tanaka," makes sure that the printing has been completed. As has been described thus far, in the image processing system of this embodiment, a multi-function printer is made to execute the print processing by a print instruction, while a maximum number of printable sheets are preset for each user. If print data received by the multi-function printer serving as an image formation apparatus contains a print-instructing user ID, the print processing to be performed on the basis of the print data are considered as being executed by an instruction made by a print-instructing user. Hence, the number of sheets to be printed, calculated by the multi-function printer, is added to the number of printed sheets contained in the print-limit information of the print-instructing user. Accordingly, the print-executing user who receives a print instruction can avoid a problem of having print processing for his/her own duties limited to be not executable. Consequently, an improvement is achieved in the convenience for all the users. In addition, an accurate management of print-limit information for each user can be expected.

Second Embodiment

Figure 10:
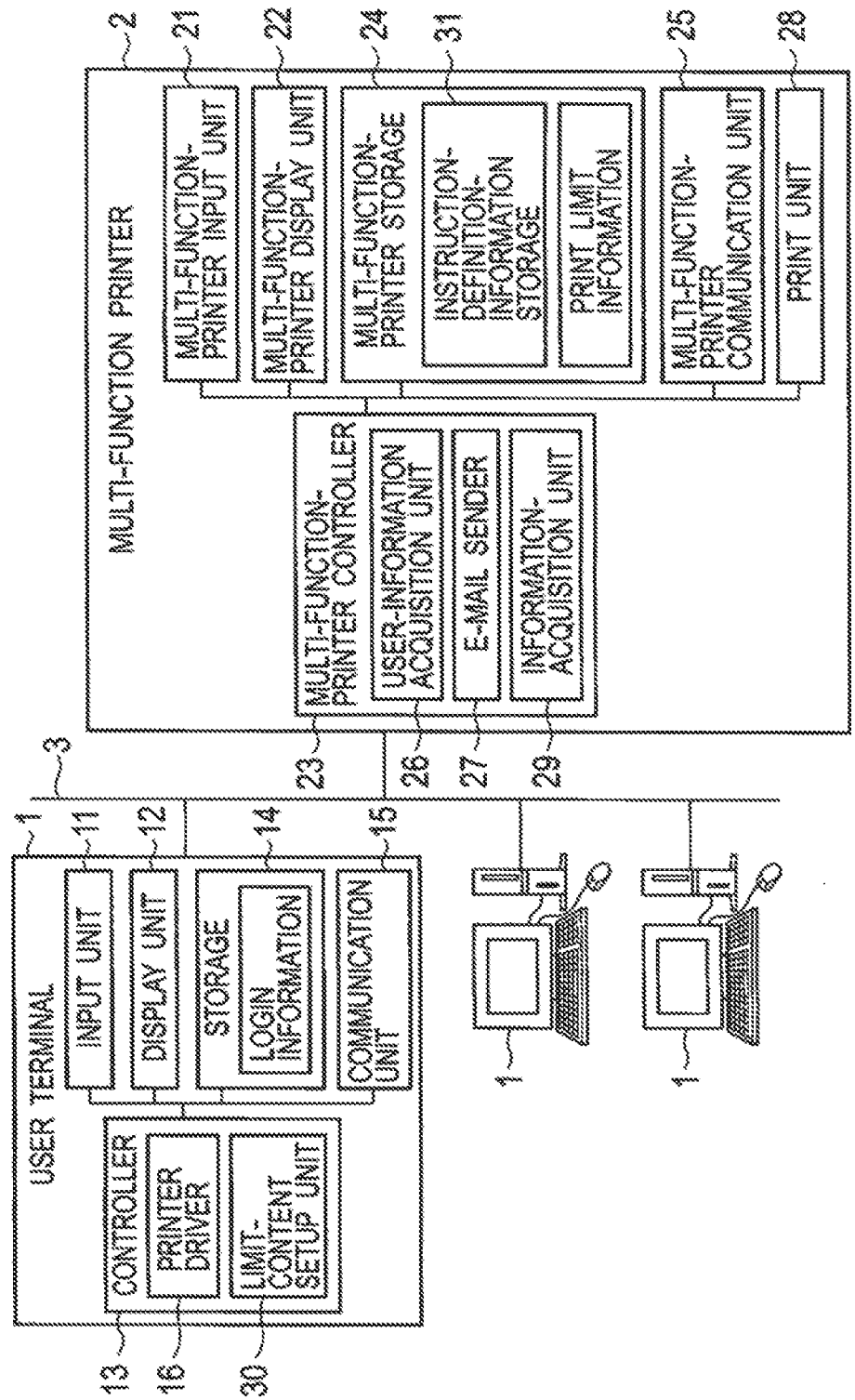
FIG. 10 is a descriptive diagram illustrating the configuration of an image formation system according to a second embodiment.

FIG. 10 is a descriptive diagram illustrating the configuration of an image formation system according to a second embodiment. Those portions identical to the ones in the first embodiment are denoted by the same reference numerals used and the description thereof is omitted.

FIG. 10 shows limit-content setup unit 30, which is implemented by controller 13 of user terminal 1 and the control program stored in storage 14. Limit-content setup unit 30 has a function of making display unit 12 display a print-instruction definition screen that allows the setting-up of the maximum number of printable sheets when one user instructs another user to make prints and allows the second user to use the print-limit information of the first user. In addition, limit-content setup unit 30 has a function to form print-instruction definition information on the basis of the content inputted through the print-instruction definition screen.

In addition, limit-content setup unit 30 also has a function to create a print-instruction ID, which is the identifier of the print-instruction definition information when limit-content setup unit 30 forms print-instruction definition information.

FIG. 11 is a descriptive diagram illustrating the print-instruction definition screen. As FIG. 11 shows, the print-instruction definition screen includes: an entry field used to designate a print-executing user; an entry field used to input the number of sheets allowed to be printed, which is used to determine the maximum number of printable sheets; an entry field to input a print-allowing period in which the defined content is valid; an OK key used to confirm the inputted content; and a cancel key used to stop the inputting of the print-instruction definition information.

FIG. 12 is a descriptive diagram illustrating the configuration of the print-instruction definition information. As FIG. 12 shows, the print-instruction definition information contains such items as a print-instruction ID (identifier), a print-instructing-user name, a print-instructing user ID, a print-executing-user ID, the number of sheets allowed to be printed, a print-allowing period, and the like.

FIG. 10 shows instruction-definition-information storage 31 of multi-function printer 2. Instruction-definition-information storage 31 is a constituent element in which multi-function-printer controller 23 stores the print-instruction definition information received through network 3 and multi-function-printer communication unit 25. The temporary memory of multi-function-printer storage 24 can be used as instruction-definition-information storage 31.

Figure 13:
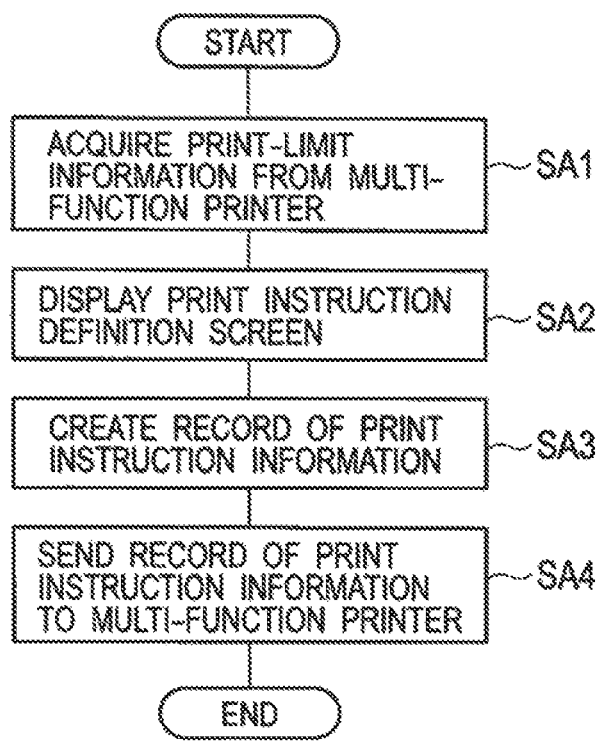
FIG. 13 is a flowchart illustrating registration processing of print-instruction definition information.

FIG. 13 is a flowchart illustrating the registration processing to register the print-instruction definition information. The registration processing is described with steps denoted by SA.

At step SA1, a user performs input operations to set up print-instruction definition information through input unit 11 of his/her user terminal 1. Then, limit-content setup unit 30 of user terminal 1 reads the User ID from the login information stored in storage 14. Then, limit-content setup unit 30 makes communication unit 15 send a message requesting print-limit information attached with the User ID through network 3 to multi-function printer 2, and thereby acquires the corresponding print-limit information from multi-function printer 2.

At step SA2, on the basis of the acquired print-limit information, limit-content setup unit 30 determines those items that are settable through the print-instruction definition screen. For instance, if color printing is made unexecutable in the first place by the print-limit information, the item concerning color printing is omitted from the print-instruction definition screen. Limit-content setup unit 30 then makes display unit 12 display the determined items in the print-instruction definition screen. Then, the user makes inputs in the items in the displayed print-instruction definition screen.

Now suppose a case where the print-instruction definition screen shown in FIG. 11 is displayed. In this case, at step SA3, if limit-content setup unit 30 recognizes that the necessary inputs are made for the print-executing user, the number of sheets allowed to be printed, and the print-allowing period, and that the OK key is pressed on, limit-content setup unit 30 reads both the User Name and the User ID contained in the login information stored in storage 14. Limit-content setup unit 30 sets up the read User Name and User ID as the print-instructing-user name and the print-instructing user ID, respectively. Then, limit-content setup unit 30 combines the content inputted through the print-instruction definition screen with the print-instructing-user name and the print-instructing user ID, and thereby creates a record of print-instruction information.

At step SA4, limit-content setup unit 30 sends the record of the print-instruction information to multi-function printer 2, and thereby makes instruction-definition-information storage 31 of multi-function printer 2 store the print-instruction definition information. Then, the registration processing to register the print-instruction definition information is terminated. If multi-function-printer controller 23 of multi-function printer 2 receives the record of the print-instruction information, multi-function-printer controller 23 forms print-instruction definition information and then stores the print-instruction definition information in instruction-definition-information storage 31. To form the print-instruction definition information, the print-instruction ID created by limit-content setup unit 30 is combined with the print-instructing-user name, the print-instructing user ID, the print-executing-user ID, the number of sheets allowed to be printed, the print-allowing period, and the like all of which are contained in the received record.

Now, description is provided below of print processing by an image formation system according to the second embodiment in the above described configuration.

Figure 14:
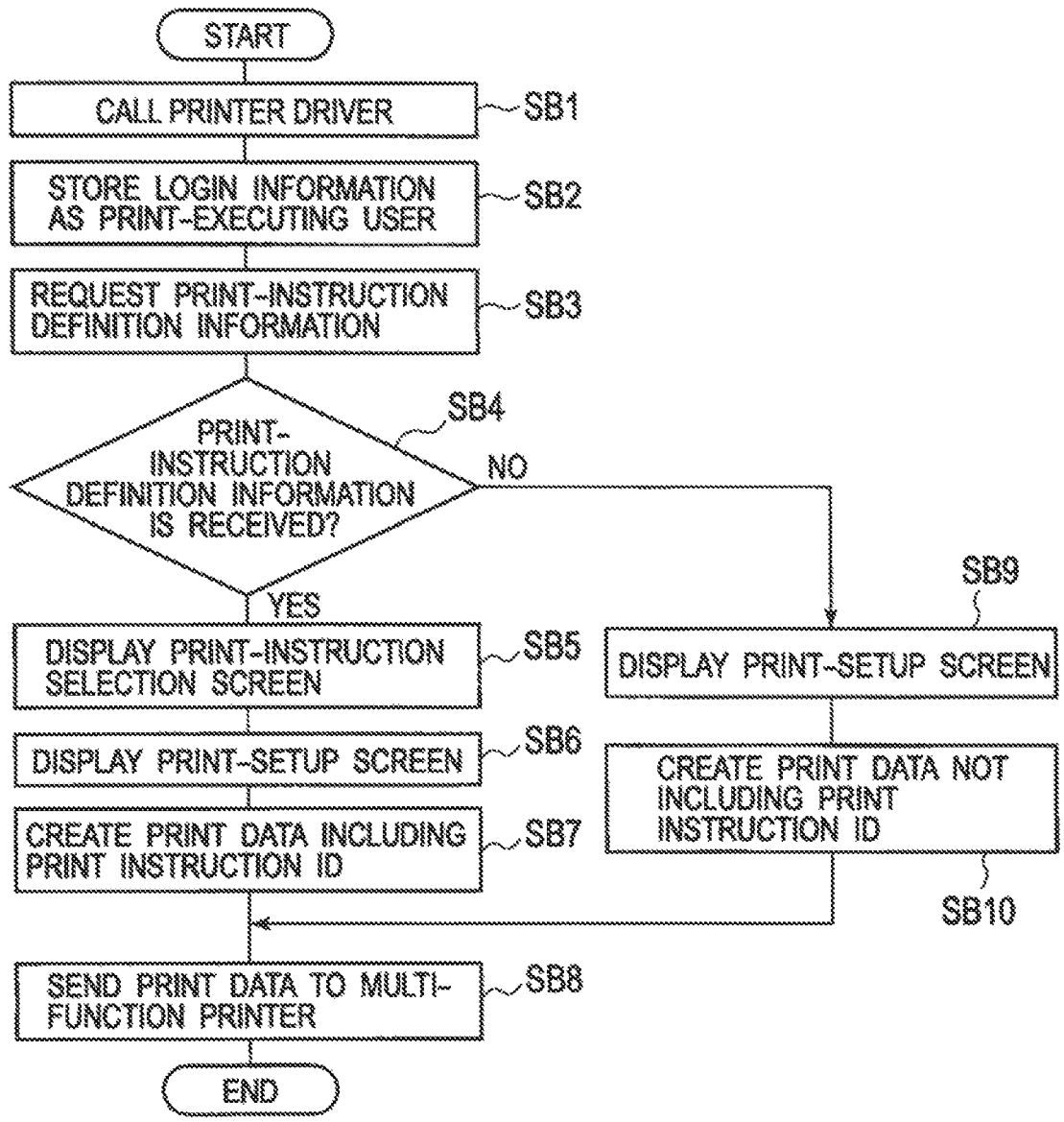
FIG. 14 is a flowchart illustrating print-data creation using a user terminal according to the second embodiment.

First of all, processing to create print data are described by referring to the flowchart shown in FIG. 14 illustrating the print-data creation by the user terminal according to the second embodiment with steps denoted by SB.

At step SB1, if controller 13 of user terminal 1 determines that print-execution operations are performed through input unit 11, controller 13 calls printer driver 16 from the application program.

At step SB2, controller 13 reads the stored login information. Controller 13 stores and holds the read login information as print-executing-user information in storage 14. At step SB3, controller 13 makes communication unit 15 send, through network 3 to multi-function printer 2, a message requesting the print-instruction definition information attached with the print-executing-user ID of the read login information. Thereby, controller 13 requests the multi-function printer 2 to send the print-instruction definition information. Upon receiving the request message, multi-function-printer controller 23 uses the print-executing-user ID to search instruction-definition information storage 31 for the print-instruction definition information. Multi-function-printer controller 23 sends, to user terminal 1, a result notification attached with information on whether the print-instruction definition information does or does not exist and with the print-instruction definition information if such print-instruction definition information does exist.

At step SB4, if controller 13 receives print-instruction definition information attached to the result notification received from multi-function printer 2, controller 13 proceeds to step SB5. If controller 13 receives no print-instruction definition information because no such print-instruction definition information exists, controller 13 proceeds to step SB9.

At step SB5, if controller 13 receives the print-instruction definition information, controller 13 makes display unit 12 display a print-instruction selection screen where the print-instructing-user name and the number of sheets allowed to be printed are placed next to each other.

Figure 15:
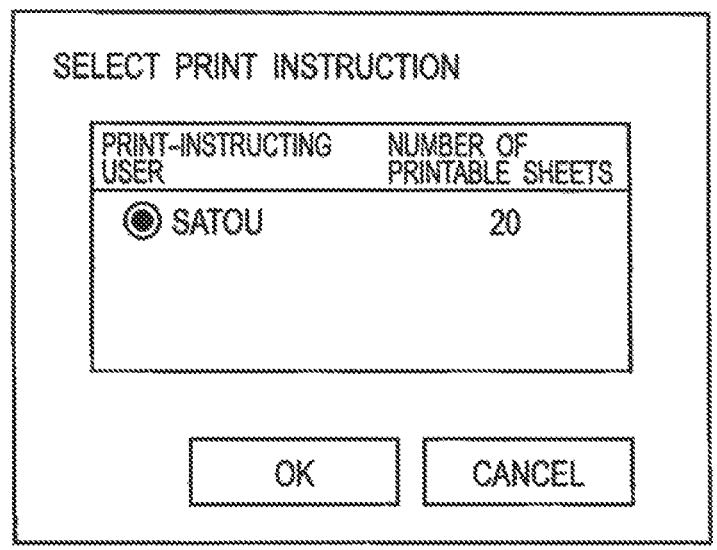
FIG. 15 is a descriptive diagram illustrating a print-instruction selection screen.

FIG. 15 is a descriptive diagram illustrating a print-instruction selection screen. As FIG. 15 shows, the print-instruction selection screen includes: a statement such as "Select print instruction" to prompt the selection of print-instruction definition information; a list displaying a print-instructing user name and the content of the instruction information, such as the number of sheets allowed to be printed, which is set up by the print-instructing user; radio buttons used to designate items of instruction information on the list; an OK key used to confirm the designated input; and a cancellation key to stop the selection of the print-instruction definition information. The user makes an input into each radio button displayed in the print-instruction definition screen, and then presses the OK key.

At step SB6, controller 13 stores, in storage 14, the print-instruction ID contained in print-instruction definition information whose radio button in the print-instruction definition screen has been input. Then, controller 13 makes display unit 12 display a print-setup screen where inputs are to be made in order, for instance, to designate the print target, to determine the number of sheets to be printed, and to determine whether color printing is or is not necessary. The user inputs the name of the document to be printed through the print-setup screen.

At step SB7, controller 13 reads the document corresponding to the inputted document name from storage 14, and also reads, from storage 14, both the login information and the print instruction ID. Then, printer driver 16 creates print data by combining the login information, the print instruction ID, and the content inputted on the print-setup screen.

FIG. 16 is a descriptive diagram illustrating an example of image data according to the second embodiment. As FIG. 16 shows, the print data includes, for instance, the following items: a name of the computer represented by "Computer Name"; a print-executing user ID represented by "User ID"; a password of the login information represented by "PASSWORD"; a print instruction ID represented by "Instruction Job ID"; a port name of multi-function printer 2 represented by "Port Name"; printing date and time represented by "Reception Time"; a name of the document to be printed represented by "Document Name"; the number of pages to be printed represented by "Page"; and items indicating data of the document and images to be printed, the print description language for the data, the number of copies to be printed and a print-instructing user ID.

At step SB8, controller 13 makes communication unit 15 send the created print data through network 3 to multi-function printer 2, and thereby terminates the processing of the print-data creation.

If controller 13 receives no print-instruction definition information at step SB4, controller 13 makes display unit 12 display a print-setup screen at step SB9 because the printing to be executed is considered to be not instructed by other users.

At step SB10, controller 13 reads, from storage 14, the document corresponding to the document name inputted through the print-setup screen, and also reads, from storage 14, the print-executing-user information stored at step SB2. Then, printer driver 16 combines the read print-executing-user information with the content inputted through the print-setup screen, and thereby creates print data that contains no print-instruction ID. Then, controller 13 proceeds to step SB8, sends the created print data to multi-function printer 2, and then terminates the processing of print-data creation.

Figure 17:
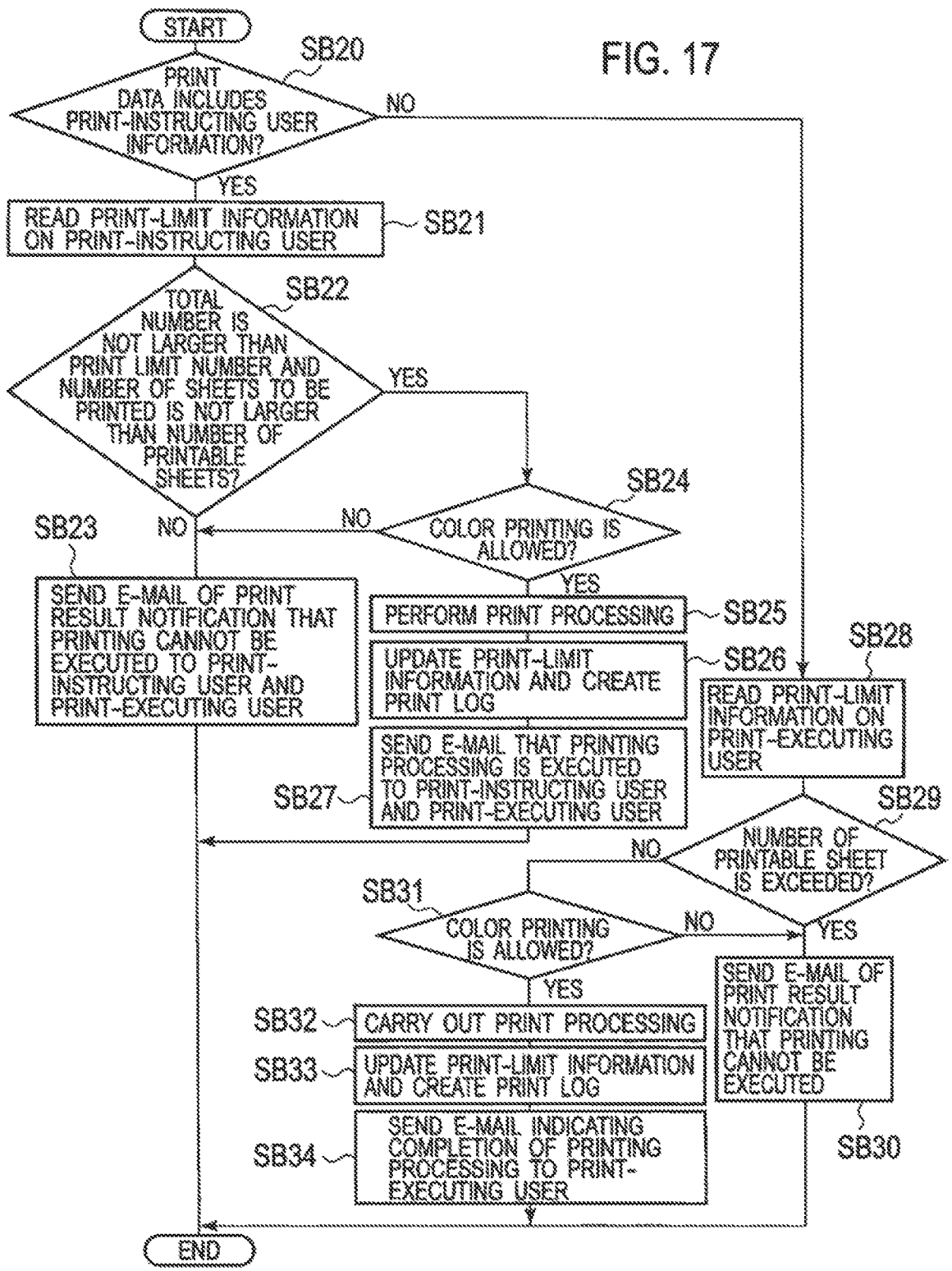
FIG. 17 is a flowchart illustrating print processing by a multi-function printer according to the second embodiment.

Next, the print processing is described by referring to the flowchart shown in FIG. 17 illustrating the print processing by the multi-function printer according to the second embodiment with steps denoted by SB. Note that the print processing of this first embodiment is for color printing.

At step SB20, multi-function-printer controller 23 of multi-function printer 2 stores print data received from user terminal 1 in multi-function-printer storage 24 and user-information acquisition unit 26 performs processing to acquire print-executing-user information and print-instruction ID from the print data.

Then, if user-information acquisition unit 26 acquires the print-instruction ID from the print data, user-information acquisition unit 26 proceeds to step SB21. If, in contrast, the print data contain no print-instruction ID and user-information acquisition unit 26 fails to acquire a print-instruction ID, user-information acquisition unit 26 proceeds to step SB28. Note that the acquired print-executing-user information is stored in multi-function-printer storage 24.

At step SB21, on the basis of the acquired print-instruction ID, user-information acquisition unit 26 reads the print-instruction definition information from instruction-definition-information storage 31, and acquires the print-instructing user ID contained in the print-instruction definition information. Then, on the basis of print-instructing user ID, information-acquisition unit 29 reads the corresponding print-limit information from multi-function-printers storage 24.

At step SB22, on the basis of the number of pages to be printed and the number of print copies contained in the print data, multi-function-printer controller 23 calculates the number of sheets to be printed in the printing processing of this time. Then, multi-function-printer controller 23 judges whether a total number of the number of printed sheets contained in the read print-limit information and the calculated number of sheets to be printed does or does not exceed the maximum number of printable sheets contained in the print-limit information. In addition, multi-function printer controller 23 judges whether the number of sheets to be printed does or does not exceed the number of sheets allowed to be printed contained in the print-instruction definition information read from the instruction-definition-information storage 31.

Then, if multi-function-printer controller 23 judges that the total number of sheets does not exceed the maximum number of printable sheets and, at the same time, the number of sheets to be printed does not exceed the number of sheets allowed to be printed, multi-function-printer controller 23 proceeds to step SB24. If, the total number of sheets exceeds the maximum number of printable sheets, or if the number of sheets to be printed exceeds the number of sheets allowed to be printed, multi-function-printer controller 23 proceeds to step SB23.

At step SB23, multi-function-printer controller 2323 creates a print-result notification which states that the printing is not executable due to the print limit. In the meanwhile, information-acquisition unit 29 reads, from the print-limit information in multi-function-printer storage 24, the mail address of the print-instructing user and the mail address of the print-executing user. Then, e-mail sender 27 sends an e-mail with the created print-result notification to both the print-instructing user and the print-executing user. Thus, the print processing is stopped and terminated.

At step SB24, on the basis of the information, contained in the print-limit information, on whether color printing is or is not executable, multi-function-printer controller 23 checks whether the stored print data are printable or not. If multi-function-printer controller 23 judges that the print data are printable, multi-function-printer controller 23 proceeds to step SB25. If, in contrast, multi-function-printer controller 23 judges that the print data are not printable, multi-function-printer controller 23 proceeds to step SB23, and thus stops and terminates the print processing.

At step SB25, multi-function-printer controller 23 makes print unit 28 carry out the print processing to print the document of the print target contained in the print data.

At step SB26, multi-function-printer controller 23 adds the number of sheets to be printed calculated at step SB22, to the number of printed sheets contained in the print-limit information corresponding to the print-instructing user ID to update the print-limit information. In addition, multi-function-printer controller 23 creates a print log (log information) containing a content stating that print processing has been executed using the print data received from the print-executing user by the instruction of the print-instructing user. Multi-function-printer controller 23 stores the created print log in multi-function-printer storage 24.

At step SB27, multi-function-printer controller 23 creates an e-mail containing: a statement notifying that the printing is executed by an instruction made by the print-instructing user; the print-executing-user name; the name of multi-function printer 2 that executed the printing; a document name indicating the name of the print target; the number of printed sheets; and printing data and time. On the basis of the print-instructing user ID of the print data, information-acquisition unit 29 refers to the stored print-limit information, and reads the corresponding mail address. Then, e-mail sender 27 sends the e-mail thus created to the mail address of the print-instructing user.

Similarly, multi-function-printer controller 23 reads an e-mail containing: a statement notifying the print-instructing user that the printing is completed; the print-instructing user; the name of multi-function printer 2 that executed the printing; a document name; the number of printed sheets; and printing date and time. Information-acquisition unit 29 reads the mail address of the print-executing user from the print-limit information. Then, e-mail sender 27 sends the e-mail thus created to the print-executing user and terminates the print processing.

If information-acquisition unit 29 fails to acquire any print-instruction ID at step SB20, information-acquisition unit 29 uses the print-executing-user information contained in the print data to read print-limit information from multi-function-printer storage 24 at step SB28.

At step SB29, on the basis of the number of pages to be printed and the number of printed copies contained in the print data, multi-function-printer controller 23 calculates the number of sheets to be printed in the printing processing of this time. Then, multi-function-printer controller 23 judges whether a total number of the number of printed sheets contained in the read print-limit information and the calculated number of sheets to be printed does or does not exceed the maximum number of printable sheets contained in the print-limit information. If multi-function-printer controller 23 judges that the total number of sheets does not exceed the maximum number of printable sheets, multi-function-printer controller 23 proceeds to step SB31. If, in contrast, multi-function-printer controller 23 judges that the total number of sheets exceeds the maximum number of printable sheets, multi-function-printer controller 23 proceeds to step SB30.

At step SB30, multi-function-printer controller 23 creates a print-result notification which states that the printing is not executable due to the print limit. In the meanwhile, information-acquisition unit 29 reads, from the print-limit information in multi-function-printer memory 24, the mail address of the print-executing user. Then, e-mail sender 27 sends the created print-result notification to the mail address and then stops and terminates the print processing.

At step SB31, on the basis of the information contained in the print-limit information and indicating whether color printing is executable, multi-function-printer controller 23 judges whether the stored print data are or are not printable. If multi-function-printer controller 23 judges that the print data are printable, multi-function-printer controller 23 proceeds to step SB32. If, in contrast, multi-function-printer controller 23 judges that the print data are not printable because color printing is not executable, multi-function-printer controller 23 proceeds to step SB30, and thus stops and terminates print processing.

At step SB32, multi-function-printer controller 23 makes print unit 28 carry out the print processing to print the document of the print target contained in the print data.

At step SB33, multi-function-printer controller 23 adds the number of sheets to be printed calculated at step SB22 to the printed number of sheets contained in the print-limit information of the print-executing user to update the print-limit information. In addition, multi-function-printer controller 23 creates a print log containing a content stating that print processing has been executed using the print data. Multi-function-printer controller 23 stores the created print log in multi-function-printer storage 24.

At step SB34, information-acquisition unit 29 reads the mail address of the print-executing user from the print-limit information in multi-function-printer storage 24, and multi-function-printer controller 23 creates an e-mail notifying that the print processing has been completed. Then, e-mail sender 27 sends the created e-mail to the mail address of the print-executing user, and thus the print processing is completed.

As has been described thus far, in this second embodiment, the print-instructing user is allowed to set up the print-instruction definition information containing the number of sheets allowed to be printed. Hence, the second embodiment can have the following effects in addition to those obtained in the first embodiment. Firstly, the print-executing user is prevented from printing sheets beyond the assumption of the print-instructing user. As a consequence, print-limit information for each user can be managed more strictly.

In addition, the case of an ill-intentioned print-executing user forging an instruction by a print-instructing user to make a user terminal send print data to the multi-function printer for printing, can be avoided.

Note that the description of each of the embodiments given above is based on the case where a multi-function printer is used as an image formation apparatus. The invention is also applicable to cases where a printer or an image processing apparatus is used in place of the multi-function printer. In addition, in the embodiments, description is given of the limits on the printer functions of a multi-function printer, but such limits are applicable as well to both the photocopier functions and to the fax-machine functions.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A data processing apparatus comprising:
 a user-information acquisition unit configured to acquire information of a second user different from a first user, wherein the first user inputs a job to cause the data processing apparatus to perform data processing;
 a data processing unit configured to perform data processing in response to the first user's input job;
 a data processing-information recording unit configured, when the second-user information is acquired by the user-information acquisition unit and the data processing is executed by the data processing unit, to record, on the basis of the execution of the data processing by the data processing unit in response to the first user's input job, processing information based on the data processing in connection with the second-user information; and
 a notification unit configured to notify the second user of the processing information based on the data processing executed by the data processing unit,
 wherein, when the data processing executed as a result of the first user's input job is performed by the data processing apparatus, the notification unit notifies the second user of execution of the job input by the first user.

2. The data processing apparatus according to claim 1, wherein
 the user-information acquisition unit is configured to acquire information of the first user as well as the second-user information, and
 the data processing-information recording unit is configured, when the second-user information is not acquired by the user-information acquisition unit, to record the processing information based on the data processing in connection with the first-user information.

3. The data processing apparatus according to claim 1, wherein
 the user-information acquisition unit is configured to acquire information of the first user and the second user from data received by and to be processed by the data processing unit.

4. The data processing apparatus according to claim 1, wherein
 the data processing comprises a printing unit, and
 the processing information based on the data processing comprises a print history executed by the printing unit.

5. The data processing apparatus according to claim 1, wherein the notification unit is configured to notify the second user of the processing information based on the data processing executed by the data processing unit.

6. The data processing apparatus according to claim 1, further comprising:
 a process-limit information acquisition unit configured to acquire process-limit information of the second user which contains information on which data processing is executable or unexecutable by the data processing apparatus for the second user; and
 a control unit configured, based on the process-limit information of the second user, to determine whether or not the data processing apparatus executes the data processing in response to the first user's input job.

7. A data processing system comprising:
 the data processing apparatus according to claim 1, and
 a terminal device configured to transmit, to the data processing apparatus, the second-user information inputted to the terminal device.

8. The data processing system according to claim 7, wherein
 the terminal device includes a driver configured to allow a user to input the second-user information.

9. The data processing system according to claim 8, wherein
 the second-user information is related to the job input by the first user.

10. The data processing system according to claim 9, wherein
 the second user instructs the first user to input the job.

11. The data processing apparatus according to claim 1, wherein the notifying by the notification unit is made to a notification destination associated with the second user.

12. The data processing apparatus according to claim 1, wherein the second-user information acquired by the user-information acquisition unit is associated with the first user's input job.

13. The data processing apparatus according to claim 1, wherein the data processing apparatus determines whether or not the first user's input job is to be executed based on print-limit information of the second user.

14. A data processing apparatus comprising:
- a user-information acquisition unit configured to acquire information of a second user different from a first user, wherein the first user inputs a job to the data processing apparatus to cause the data processing apparatus to perform data processing; and the second user instructs the first user to input the job to cause the data processing apparatus to perform the data processing,
- a data processing unit configured to perform data processing in response to the first user's input job;
- a data processing-information recording unit configured, when the second-user information is acquired by the user-information acquisition unit and the data processing is executed by the data processing unit, to record, on the basis of the execution of the data processing by the data processing unit in response to the first user's input job, processing information based on the data processing in connection with the second-user information,
- wherein a processing record of the second user is updated when the data processing is executed by the data processing unit.

* * * * *